US008870398B2

(12) United States Patent
Haynes

(10) Patent No.: US 8,870,398 B2
(45) Date of Patent: Oct. 28, 2014

(54) COLLAPSIBLE SNOOT ASSEMBLY FOR MOTION PICTURE LIGHTING FIXTURE

(76) Inventor: W. Mark Haynes, Huntington Beach, CA (US)

( * ) Notice: Subject to any disclaimer, the term of this patent is extended or adjusted under 35 U.S.C. 154(b) by 0 days.

(21) Appl. No.: 13/373,918

(22) Filed: Dec. 6, 2011

(65) Prior Publication Data

US 2013/0141795 A1 Jun. 6, 2013

(51) Int. Cl.
*G03B 15/00* (2006.01)

(52) U.S. Cl.
USPC .................. 362/16; 362/3; 362/352; 362/357

(58) Field of Classification Search
USPC ........................ 362/16, 351–352, 355–361, 3
See application file for complete search history.

(56) References Cited

U.S. PATENT DOCUMENTS

| | | | | |
|---|---|---|---|---|
| 5,651,602 | A * | 7/1997 | Tawil et al. | 362/18 |
| 5,915,828 | A * | 6/1999 | Buckley | 362/293 |
| 6,960,004 | B1 * | 11/2005 | Hsieh | 362/450 |
| 7,722,201 | B2 * | 5/2010 | Manger | 362/18 |
| 2005/0105293 | A1 * | 5/2005 | Hsu | 362/352 |

FOREIGN PATENT DOCUMENTS

GB 2450569 A * 12/2008

* cited by examiner

*Primary Examiner* — Robert May
(74) *Attorney, Agent, or Firm* — J David Haynes

(57) ABSTRACT

A collapsible snoot assembly for motion picture lighting fixture having a cylindrical body of a fabric material configured to expand and collapse along a longitudinal axis between expanded and collapsed positions having a biasing means for biasing the cylindrical body into an expanded position and a lighting fixture attachment means for securing the cylindrical body to a lighting fixture such that light projected from the lighting fixture is directed through the collapsible snoot assembly.

4 Claims, 10 Drawing Sheets

PRIOR ART

COLLAPSIBLE SNOOT ASSEMBLY FOR MOTION PICTURE LIGHTING FIXTURE

BACKGROUND OF THE INVENTION

The field of the invention is lighting for motion pictures.

Production of motion pictures requires various lighting conditions and effects. Motion picture filming may take place indoors or outdoors, with various natural or background lighting conditions. Under many conditions, additional lighting is required. Various lighting equipment has been made and used to meet these requirements, such as conventional motion picture or theatrical lighting fixtures, screens, reflectors, gels, snoots, etc. While existing lighting equipment has generally met the needs of the motion picture industry, the large amount of lighting equipment needed and used has several disadvantages. For example, when filming on location, all of the lighting equipment must be packed, transported, unpacked, and set up. Accordingly, the need for different pieces of lighting equipment may at times be met only with significant time and effort by lighting technicians. U.S. Pat. No. 5,915,828 to Buckley, discloses a motion picture lighting fixture and a snoot for use therewith. Significant costs may also be involved in the manufacture, storage, transportation, and use of a large number of pieces of lighting equipment, particularly lighting snoots for use in light control. Prior art snoots are generally rigid and metallic in construction and pose safety hazards if accidentally dropped or dislodged during use. Accordingly, there remains a need in the motion picture industry to achieve lighting with light weight collapsible snoots for lighting equipment as well as ease in transportation of the snoots for safe, efficient use in a production environment.

During motion picture filming, it may be necessary to quickly change the lighting conditions. Accordingly, there is a need for motion lighting snoots which can be quickly and easily changed over to provide different lighting effects.

Accordingly, it is an object of the invention to provide a collapsible snoot for motion picture lighting fixtures.

SUMMARY OF THE INVENTION

To these ends, a motion picture lighting fixture includes a lamp housing holding one or more lamps or bulbs. A snoot is advantageously attached to the front of the lamp housing. The snoot may have a black coated inside wall, to eliminate white reflected ghosts, or the snoot may have a white inside coated surface to reflect light or any other predetermined surface to achieve a desired lighting effect.

In a preferred embodiment, a light weight, collapsible snoot is provided which is easy to transport and may be easily secured to the lamp housing by use of a securing means which permits ease in attachment and removal of the snoot frame with or without front and rear slots for receiving a snoot bezel as in the prior art.

The collapsible snoot of the present invention offers a wide selection of lighting options with a minimum of equipment or accessories, from a simple open front reflective lamp to a controlled density of soft light, as well as several gel frame options. The gel frames and snoots can be quickly installed and removed via a detachable securing means disposed on the lamp housing and matingly engaging a similar means on the snoot. Diffusion rings, colored gels, scrims and similar accessories may be easily inserted inside the end of the snoot to provide desired lighting effects without lighting flare.

BRIEF DESCRIPTION OF THE DRAWINGS

Other objects and features of the present invention will become apparent from the following detailed description taken in connection with the accompanying drawings which disclose several embodiments of the invention. It is to be understood, however, that the drawings are designed for the purpose of illustration only and are not intended as a definition of the limits of the invention. It is to be understood, however, that the drawings are designed for the purpose of illustration only and are not intended as a definition of the limits of the invention.

In the drawings, wherein similar reference characters denote similar elements throughout the several views.

DETAILED DESCRIPTION OF THE DRAWINGS

Figure 1:
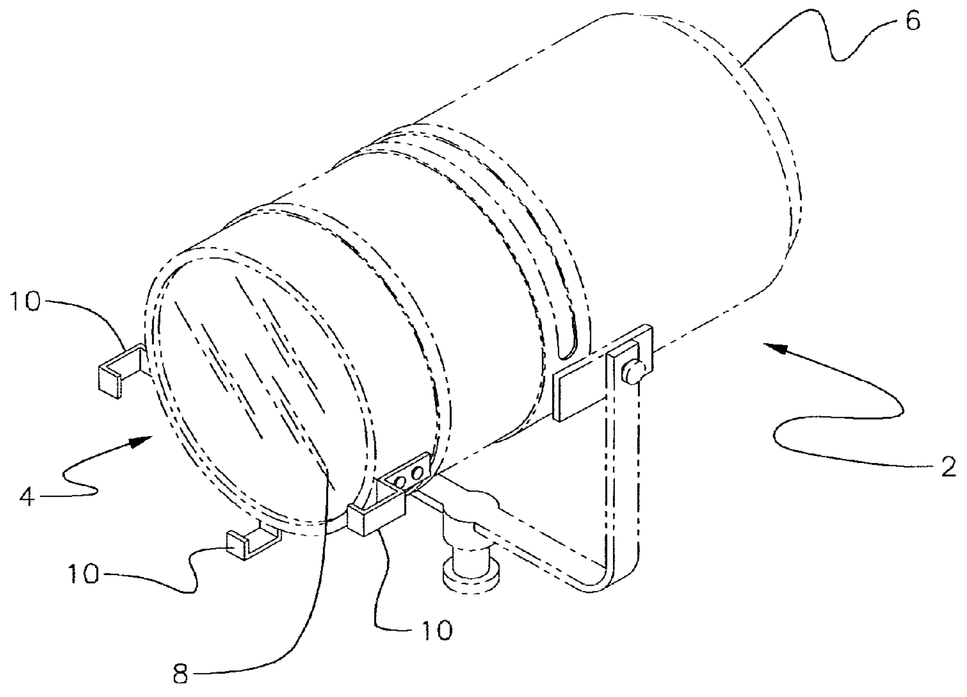
FIG. 1. Is a perspective view of a typical lighting fixture for use in the movie industry which has mounting ears for mounting engagement with a snoot according to the prior art.

In the drawings, wherein similar reference characters denote similar elements throughout the several views:

FIG. 1 discloses an exemplary motion picture lamp 2 which is cylindrical in shape from front 4 and rear 6. A lens 8 is disposed at front end 4 which permits the light generated inside motion picture lamp 2. This embodiment of motion picture lamp 2 has a plurality of ears 10 which are intended to receive there into between anything that is to be mounted on front 4 of motion picture lamp 2. Typically a snoot may be attached to the motion picture lamp 2 to control the lighting conditions. A snoot and/or diffusion rings to be disclosed herein below may be used in combination with the lamp to obtain desired lighting conditions.

Figure 2:
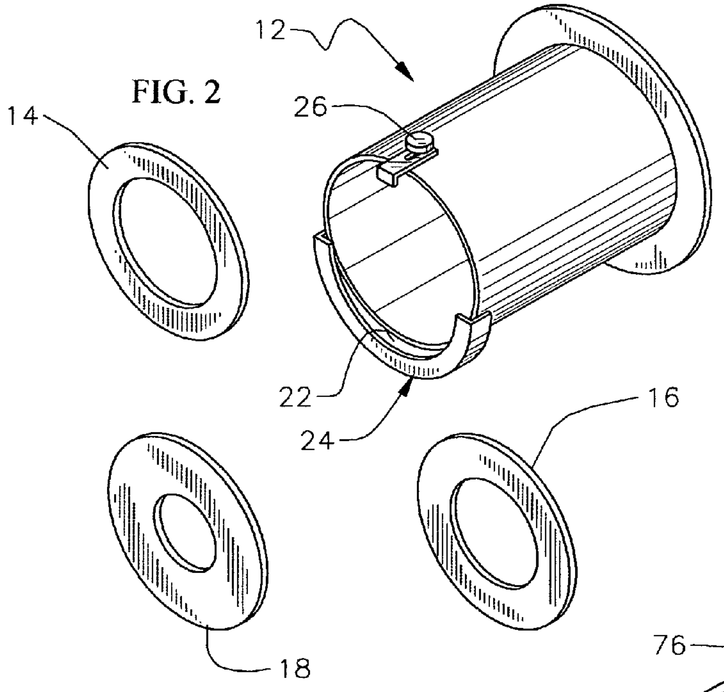
FIG. 2 is a perspective view of a prior art snoot for mating engagement with the lighting fixture shown in FIG. 1 together with diffusion rings for use therewith.

The present invention discloses a snoot that is light weight and collapsible such that it may be collapsed for ease in transporting and also provides a snoot that is light weight when compared to the metallic snoots now present in the industry as disclosed in FIG. 2. FIG. 2 disclosed a metallic snoot 12 and metallic ring 14, metallic ring 16 and metallic ring 18 for use therewith. A selected metallic ring may be engaged at end 20 (FIG. 3) of snoot 12 to obtain the desired lighting condition necessary for filming motion picture production.

Snoot 12 has an annular recessed groove 22 about a portion of end 24 of snoot 12 for receiving metallic ring 14. Snoot 12 has a locking mechanism 26 at first end of snoot 12 which is adjusted to secure metallic ring 14 into end 24 of snoot 12. Any metallic ring so configured as is metallic ring 16 and metallic ring 18 may be mounted into end 24 of snoot 12 to achieve a desired lighting condition during actual use.

Figure 3:
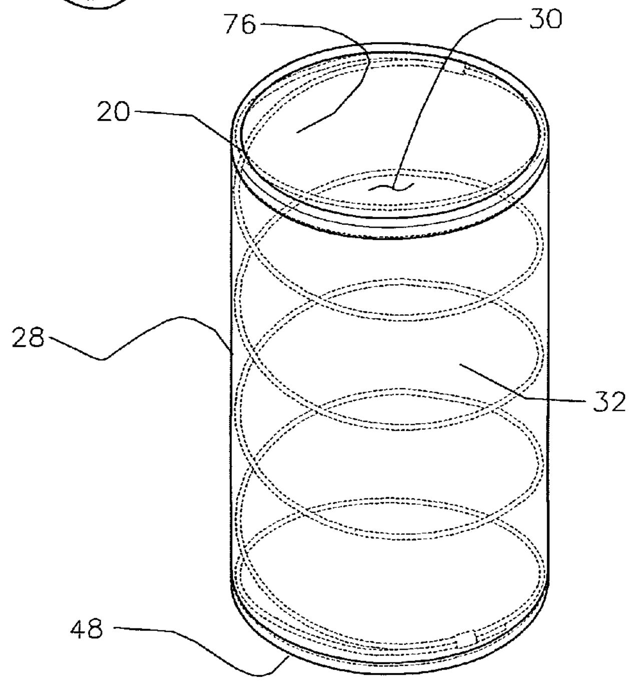
FIG. 3 is a perspective view of the snoot in the expanded position according to the present invention.

FIG. 3 discloses snoot 28 according to the present invention to be cylindrical in shape as is snoot 12 in FIG. 2; however snoot 28 is made of a fabric-like material that may have an interior surface 30 which is silver or black or any other medium desired to obtain the desired lighting condition. Snoot 28 is made of a fabric-like material 32 which is deformable, collapsible, to form a cylindrical snoot 28 which in an expanded mode 34 shown in FIG. 3. Further detail as to the configuration of snoot 28 is disclosed below.

Figure 4:
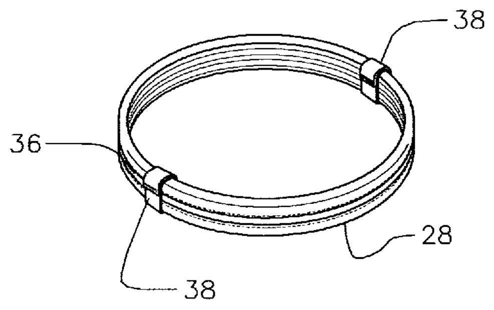
FIG. 4 is a perspective view of the snoot in the collapsed position according to the present invention.

FIG. 4 discloses snoot 28 which it is in the collapsed or decompressed mode 36. In this mode snoot 28 may be easily handled and transported. Straps 38 are wrapped about the body of snoot 28 to maintain snoot 28 in the collapsed state during non-use as well as during handling and transporting snoot 28. Snoot 28 requires substantially reduced space for storage or transportation than does snoot 12 shown in FIG. 2. Straps 38 may be made of Velcro® or a similar means for fastening the end of strap 38 back upon and to itself.

Figure 5:
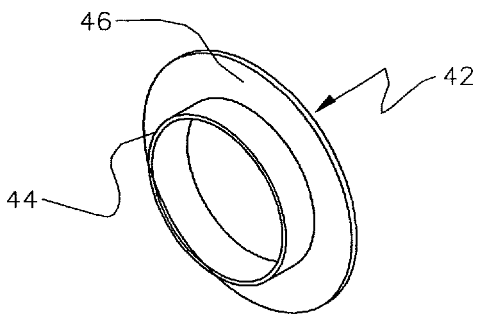
FIG. 5 is a perspective view of a bezel for mating engagement with the snoot to enable the snoot to be engaged with a lighting fixture disclosed in FIG. 1.

FIG. 5 discloses a first means for interface with snoot 28 and for connection of snoot 28 to lamp 2 disclosed in FIG. 1 and for mating engagement with ears 10. Bezel 42 has a vertical collar 44 which is perpendicular to the planar surface 46 of bezel 42. Collar 44 is of such dimension that it will mate with end 48 of snoot 28, FIG. 6. In a preferred embodiment collar 46 (FIG. 6) may be sewn to fabric-like material 32 (FIG. 3) by stitches 52 to join snoot 28 to bezel 42. This particular configuration disclosed in FIG. 6 may then be used to cause snoot 28 to be connected to lamp 2 disclosed in FIG. 1. (See, FIG. 20 for an exploded view.) This particular adaptation for connecting snoot 28 to lamp 2 may be useful for larger snoots which may be as much as wide as 24 inches and as long as 36 inches versus smaller snoots which will be lighter and may be attached by alternative means disclosed below.

Figure 7:
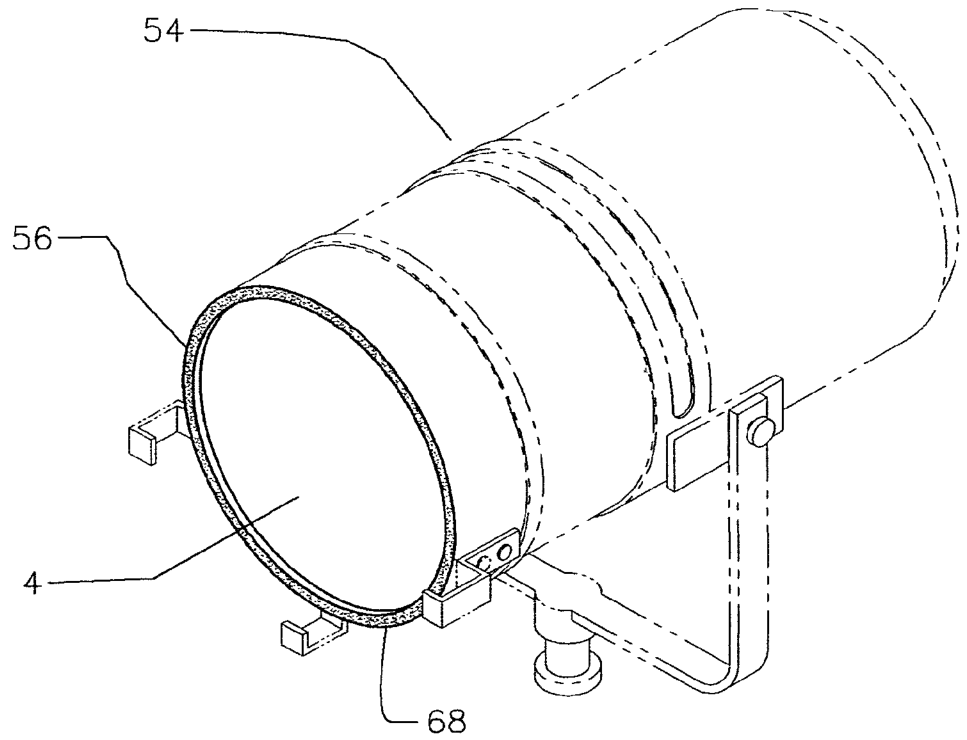
FIG. 7 is a perspective view of a lighting fixture having an innovative attachment means for mating a snoot to the lighting fixture.

FIG. 7 discloses lamp 54 having an alternative securing means 56 at the light-emitting end 4 of lamp 54 as opposed to ears 10. Alternative securing means 56 may be comprised of any means for matingly securing end 58 of snoot 28 as disclosed in FIG. 8 to light 54. Peripheral end of lamp 54 has securing means 56 attached thereto by conventional means such as glue, brads and/or screws. End 58 of snoot 28 disclosed in FIG. 8 has a mating means 60 secured thereto by conventional means such as glue, brads, sewing or any other means for a secure relationship between end 58 of snoot 28. A preferred mating means for securing means 56 may be Velcro®.

Figure 8:
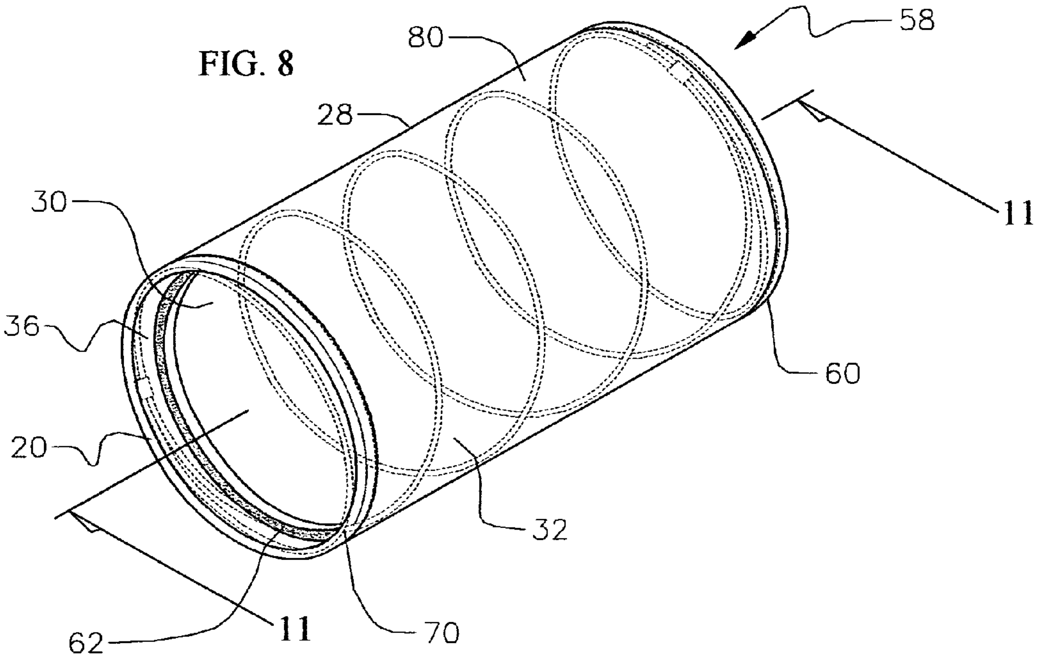
FIG. 8 is a perspective view of a preferred embodiment of the snoot having an innovative mounting means for mating a snoot to the lighting fixture of FIG. 7.

In use, securing means 60 on snoot 28, FIG. 8, is forcefully engaged against and to alternative securing means 56 on the light emitting end 4 of lamp 54 (FIG. 7) such that snoot 28 and lamp 54 present as an unitary structure. (See, exploded view in FIG. 19.)

Figure 6:
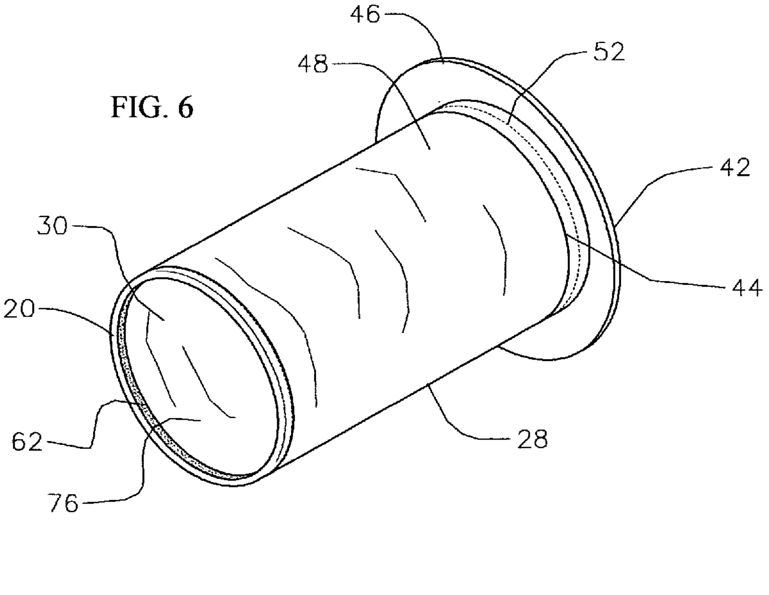
FIG. 6 is a perspective view of a preferred embodiment of snoot disclosed in FIG. 3 engaged with the bezel of FIG. 5.

Snoot 28 as disclosed in FIG. 6 and snoot 28 as disclosed in FIG. 8 may be configured to have a securing means 62 mounted on internal surface 30 of snoot 28. Such securing means 62 is for matingly receiving and securing diffusion ring 64 (FIG. 12) into snoot 28.

Figure 9:
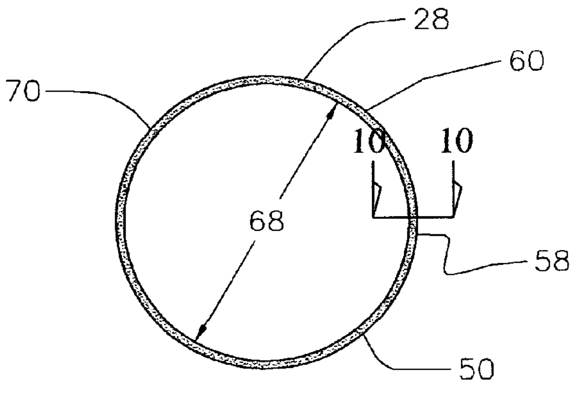
FIG. 9 is a right end view of FIG. 8.

FIG. 9 discloses a right end view of snoot 28 shown in FIG. 8 having a diameter 68. Diameter 68 varies in length depending upon the lamp with which it is to mate. In the movie industry, lamps usually vary from small lamps having a diameter of 3 inches up to 24 inches or more. An important benefit of the present invention is that snoot 28 is made of a light-weight material. Any light-weight fire retardant material may be used at the desire of the user and the particular use of the snoot.

When snoot 28 is used for directing light which generates a high temperature, material such as Nomex® available from Dupont may be used. Nomex® fiber is heat and flame resistant. The material may be 1⁄16 of an millimeter in thickness and black in appearance to prevent the transmission of light through the material. The inside of snoot 28 may be white or silver or black to achieve the particular lighting conditions desired. It is understood that any color may be used for the inside of snoot 28 as desired.

Figure 19:
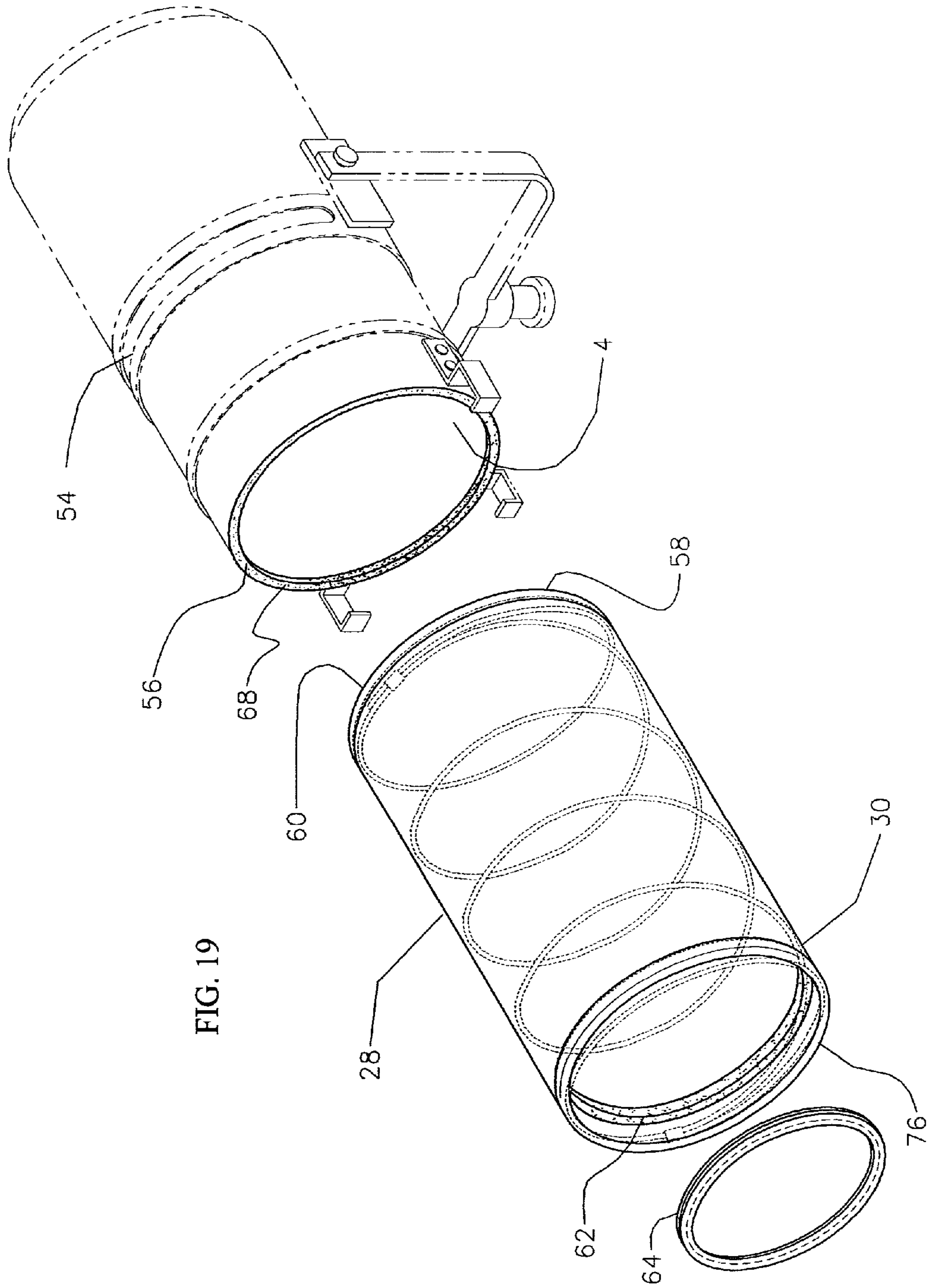
FIG. 19 discloses a preferred embodiment of the present invention and is an exploded view of the lamp of FIG. 17, the snoot of FIG. 8 and a diffusion ring as disclosed in FIG. 12 as they would be united for use.

In the embodiment disclosed in FIG. 8 and FIG. 9 the mating means 60 is disposed on end 58 of snoot 28. A similar mating means 56 is disposed at end 4 of lamp 54 instead of ears 10. It is desired that when mating means 56 (FIG. 7) on end 58 of snoot 28 engages mating means 56 on lamp 2 that mating means 56 and mating means 60 form a secure connection. While many such means may be used, a preferred embodiment is Velcro®. Velcro® is a brand name of fabric hook-and-loop fasteners. It consists of two layers: a “hook” side, which is a piece of fabric covered with tiny hooks, and a “loop” side, which is covered with even smaller and “hairier” loops. When the two sides are pressed together, the hooks catch in the loops and hold the pieces together. When the layers are separated, the strips make a characteristic “ripping” sound. An exploded view of this configuration is shown in FIG. 19. The particular material from which the mating means 56 is made is heat resistance. Mating means 56 is secured to peripheral end 68 of lamp 54 by conventional means.

Figure 10:
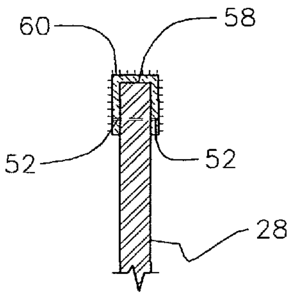
FIG. 10 is a cross-sectional view of FIG. 9.

FIG. 10 discloses a cross-sectional view of FIG. 9 disclosing mating means 60 mounted on end 58 of snoot 28. Mating means 60 is disposed about periphery 70 (FIG. 8) of snoot at end 58. Conventional means may be used to form this bonding between the end 58 of snoot 28 and securing means 60. As previously disclosed, one such securing means 60 is Velcro®. FIG. 10 disclose mating means 60 being joined to end 58 of snoot 28 by sewing the Velcro® to snoot 28. Stitches are shown as 52.

Figure 11:
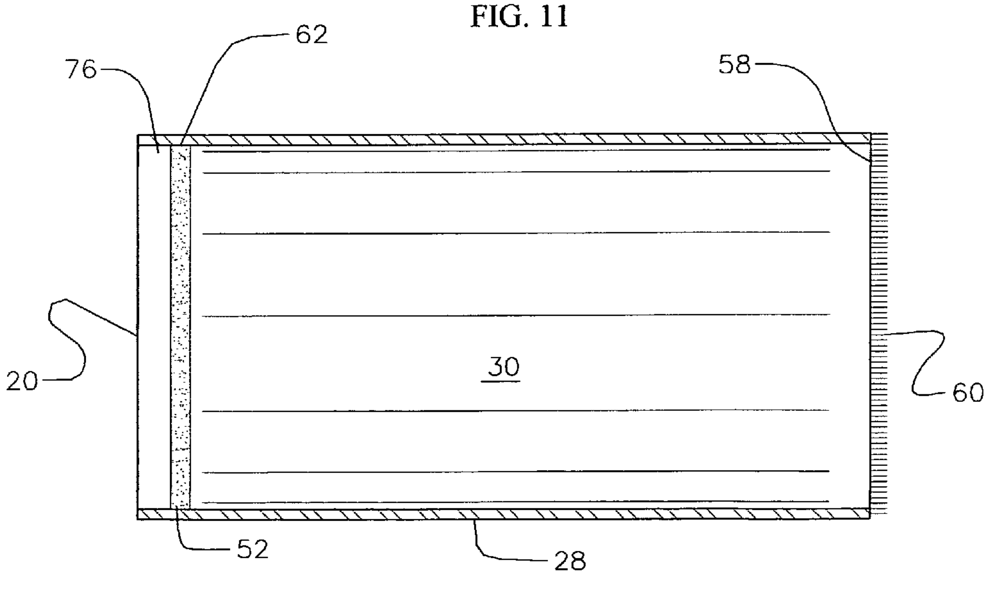
FIG. 11 is a cross-sectional linear view of FIG. 8.

Referring now to FIG. 11 which is a sectional view of FIG. 8 which discloses a longitudinal sectional view of snoot 28 from end 20 of snoot 28 to end 58 of snoot 28. End 58 has mating means 60 disposed thereon. This is the end that mates with the lamp. End 20 of snoot 28 has a securing means 62 disposed about the internal periphery 76 of internal surface 30 of snoot 28. In the preferred embodiment, securing means 62 may be sewn (stitches 52) to the fabric which comprises snoot 28 to form an annular ring about internal periphery 76 of interior 30 of snoot 28 or by any other conventional method. Securing means 62 is configured to receive there into in a mating relationship a focusing ring, a diffusion ring or any other means as the user may desire to obtain a desired lighting condition. In the preferred embodiment, diffusion ring 64 shown in FIG. 12 has securing means 72 which mates with securing means 62 on internal periphery 76 shown in FIG. 3 of interior 30 of snoot 28.

Figure 12:
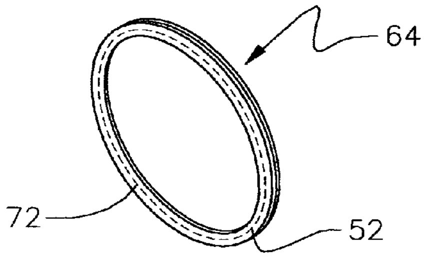
FIG. 12 discloses a top view of a diffusion ring having a connection means attached thereto.
Figure 13:
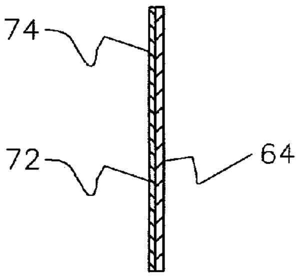
FIG. 13 is cross-sectional view of FIG. 12 showing the connection means secured to the diffusion ring.

Referring now to FIG. 12 and FIG. 13, a diffusion ring 64 is disclosed with an innovative securing means 74. Diffusion ring 64 is typical of diffusion rings used in the industry. Such a diffusion ring is generally a wafer or membrane which alters the lighting passing there through to achieve desired lighting conditions. Such membrane of different colors and different mediums and may also be of substance resembling screening or netting to control the intensity of the light.

A diffusion ring which is donut-shaped may be called a focusing ring and is used to focus the emitting light. Securing means 74 may be used with any such ring such as to cause the ring to be secured into end of snoot 20. It is desired to have the ring mount internal into end 20 of snoot 28 to prevent light from flaring or escaping tangentially from the lamp when in use.

FIG. 13 discloses a cross-sectional view of FIG. 12. Securing means 72 is mounted about the periphery 74 of diffusion ring 64. Such securing means 72 may be securing to diffusion ring 64 by any means which is heat resistant. One such securing means may be Velcro® cut into a donut shape and laid over one side of the diffusion ring and then sewn to the diffusion ring. Securing means 72 may be bradded to diffusion ring 64 or by any other means.

Figure 14:
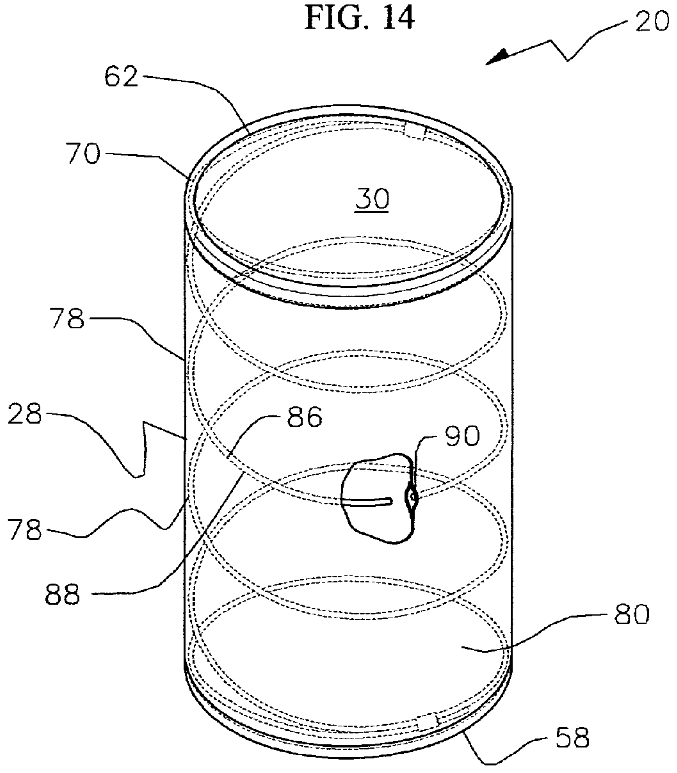
FIG. 14 is a pictorial perspective view, partially cut away, of the snoot showing the manner in which a spring is mounted in the sides thereof.

FIG. 14 is a pictorial view of snoot 28 shown in FIG. 3. Snoot 28 is made of a material such as Nomex®. Strips or ribbons 78 are sewn about outer surface 80 of snoot 28 in a helical fashion similar to a helicoid for securing a spring 84 shown in FIG. 15 to the outer surface 80 of snoot 28. Strips 78 have a width 82 sufficient to permit a spring to be positioned under strip 78. Strip 78 has a left side 86 and a right side 88. Strip 78 is sewn along its left side 86 to outer surface 80 of snoot 28 and along its right side 88 to outer surface 80 of snoot 28 to form a channel 90. Channel 90 typically has a width of ½ inch. Spring 84 (FIG. 15) is positioned in channel 90. Spring 84 has a first end 100 and a second end 102. First end 100 turns and attaches to itself by use of connector 104 to form a circle which forms the end 58 of snoot 28 while second end 102 of spring 84 turns and attaches to itself by use of connector 106 to form a circle which forms second end 20 of snoot 28. This is intended to disclose that the end 100 of helical spring 84 forms the end 58 of snoot 28 and end 102 of helical spring 84 forms the end 20 of snoot 28 as rigid circles which causes the fabric of which snoot 28 is formed to be cylindrical.

Figure 15:
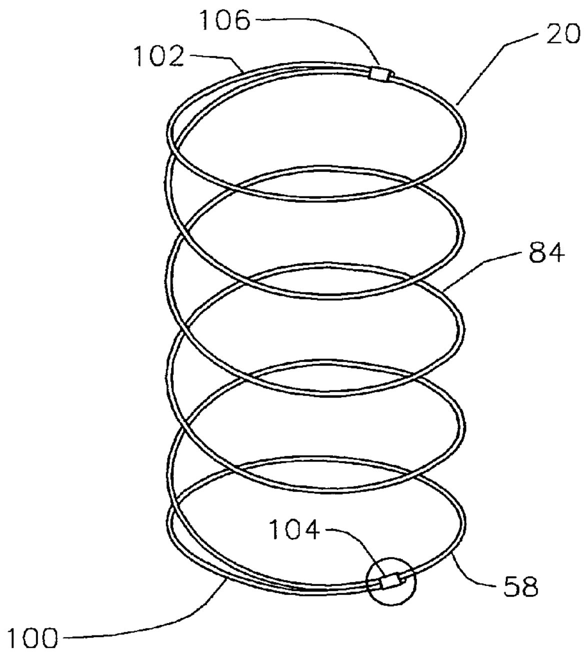
FIG. 15 is a perspective view of the snoot in an expanded mode which is inside the snoot shown in FIG. 14.
Figure 16:
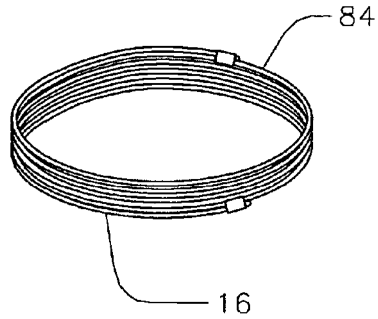
FIG. 16 is a perspective view of the snoot of FIG. 15 in a collapsed state.

FIG. 15 discloses spring 84 as it appears in an expanded mode. FIG. 16 discloses spring 84 in a collapsed mode. Snoot 28 conforms to the position of spring 84. Spring 84 wants to be in the expanded mode and will attain this position unless restrained. End 102 of spring 84 is disclosed to attach to spring 84 to form an end 20 of snoot 28 while end 100 of spring 84 attaches to spring 84 to form end 58. The entirety of spring 84 is positioned inside channel 90 as shown in FIG. 14. FIG. 4 shows snoot 28 in a collapsed mode. Snoot 28 may be caused to remain in the collapsed mode by straps 38. The number of straps used will depend upon the size of snoot 28. Straps 38 may be permanently attached to snoot 28 to prevent loss during use. Straps 38 may be of any conventional design to include Velcro®.

Figure 17:
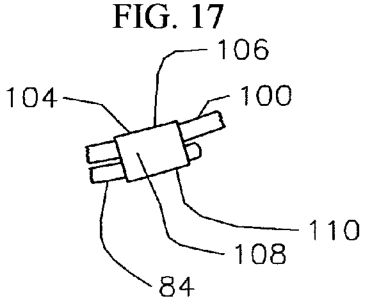
FIG. 17 discloses the collar that is used to secure the spring at its first end and at its second end.
Figure 18:
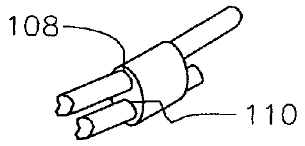
FIG. 18 is an right end view of FIG. 17.

Referring to FIG. 17 and FIG. 18: connector 104 and connector 106 are the same. FIG. 18 is a right end view of FIG. 17. The function of connector 104 and connector 106 are the same. For purposes of disclosure, this discussion will be for connector 104 for the first end of snoot 28. Spring 84 passes through connector 104 and form a circle having a diameter 58 shown in FIG. 9 and end 104 of spring 84 is secured into connector 104 to form the circle. This becomes the supporting structure for end 58 of snoot 28 shown in FIG. 14 and FIG. 15. FIG. 18 discloses a first linear channel 108 and a second linear channel 110 for receiving spring 84. Alternatively, connector 104 and connector 108 maybe as disclosed in FIG. 21 which is a length of plastic tubing having sufficient interior space to snugly fit and hold spring 84 to end 100 of spring 84.

FIG. 19 is an exploded view of the preferred embodiment of snoot 28 for use with lamp 54 and diffusion ring 64. Snoot 28 is matingly secured to lamp 54 by mating means 60 and mating means 56 of lamp 54. Snoot 28 is disclosed as having a securing means 62 on the interior surface of snoot 28 for matingly receiving diffusion disk 64. Snoot 28 is collapsible and of light weight material resulting in ease in transporting and storage.

Figures 20, 21:
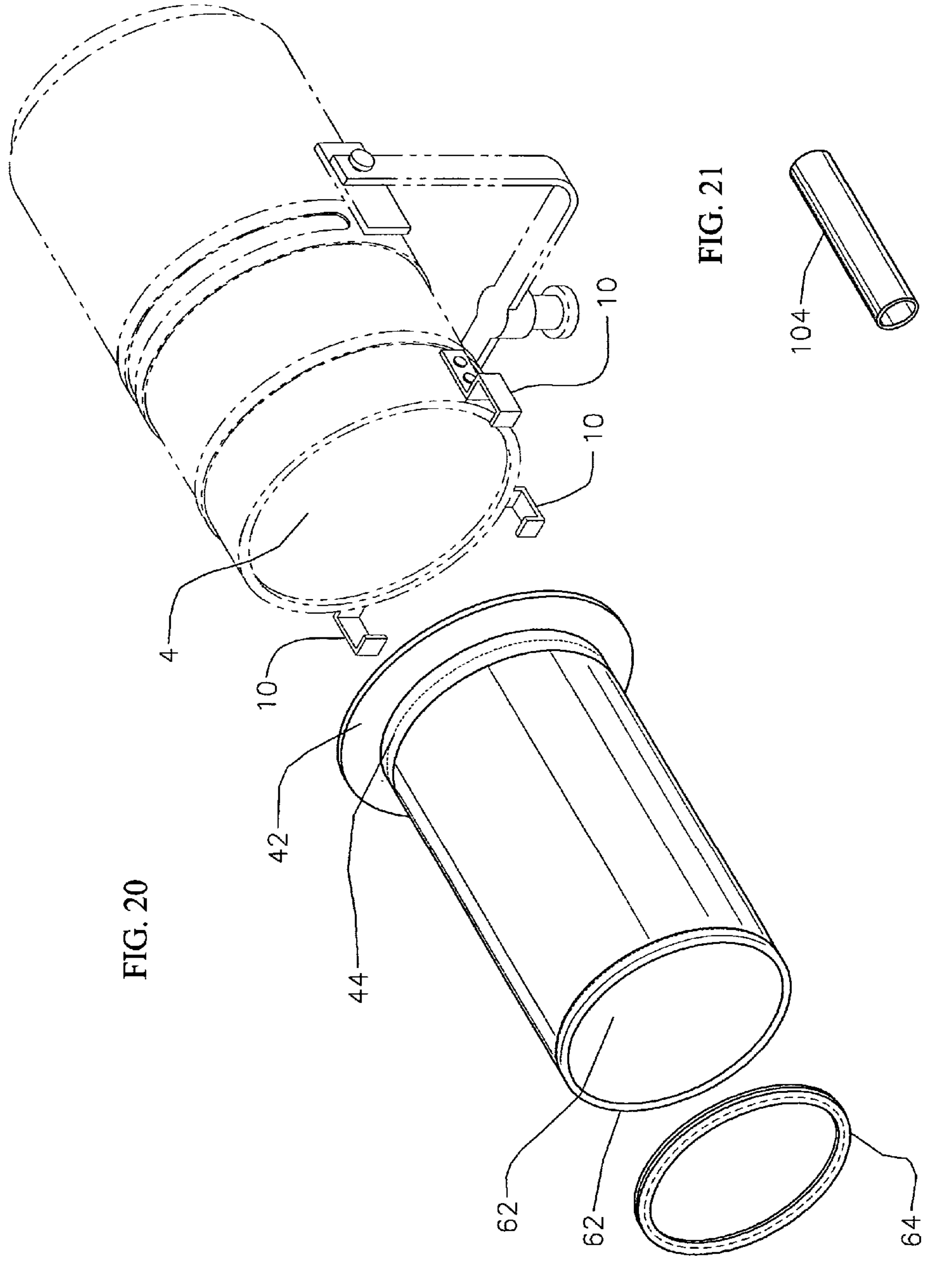
FIG. 20 is an exploded view of the lamp of FIG. 1, the snoot of FIG. 6 and a diffusion ring as disclosed in FIG. 12 as they would be united for use.

FIG. 20 discloses an alterative embodiment of snoot 28 which is configured to mate with a state-of-the-art lamp by use of a bezel 42 and collar 44. Snoot 28 has a securing means 62 on the interior surface of snoot 28 for matingly receiving diffusion disk 64. Snoot 28 is collapsible and of light weight material resulting in ease of transportation and storage. Thus, a novel snoot for use in motion picture lighting has been shown and described. Various modifications, substitutions, and uses of equivalents may be made, without departing from the spirit and scope of the invention. The invention, therefore, should not be limited, except by the appended claims.

What is claim is:

1. A light modifying snoot for use in connection with a lighting fixture, said snoot comprising:

a cylindrical tubular body having opposed first and second open ends and sidewall of a flexible fabric material extending between said first and second open ends, said sidewall defining a through passage extending between said first and said second open ends, said sidewall configured to expand and collapse along a longitudinal axis of said cylindrical tubular body between an expanded position and a collapsed position, wherein when said sidewall is in said expanded position said opposed first and second open ends are disposed at a greater distance between one another than when said sidewall is in said collapsed position;

a coil spring attached to said sidewall and biasing said sidewall into said expanded position;

a light fixture attachment member disposed at said first end of said tubular body and configured to secure said first end of said tubular body to a lighting fixture such that light projected from the lighting fixture is directed into said through passage;

a light modifier attachment member disposed at said second end of said tubular body; and a light modifier removably attached to said second end of said tubular body by said light modifier attachment member.

2. The snoot of claim 1, wherein said light modifier attachment member comprises one of a hook member or a loop member of a hook-and-loop fastener, the other one of said hook member or loop member disposed on said light modifier.

3. The snoot of claim 1 wherein said light modifier attachment member is further disposed on an interior surface of said side wall.

4. The snoot of claim 3, wherein said light modifier attachment member encircles said sidewall.

* * * * *